United States Patent [19]

Kirby

[11] Patent Number: 5,593,647
[45] Date of Patent: Jan. 14, 1997

[54] CATALYTIC CONVERTER HAVING TRI PRECIOUS METAL CATALYSTS

[75] Inventor: Charles W. Kirby, Northville, Mich.

[73] Assignee: General Motors Corporation, Detroit, Mich.

[21] Appl. No.: 414,839

[22] Filed: Mar. 31, 1995

[51] Int. Cl.$^6$ .............................. F01N 3/10; B01D 53/34
[52] U.S. Cl. .................. 422/180; 422/171; 422/177; 422/211; 422/222; 60/299; 29/890; 502/439; 502/339
[58] Field of Search .................................. 422/180, 179, 422/171, 177, 174, 211, 221, 222; 29/890; 60/299, 301; 502/66, 69, 325, 339, 439

[56] References Cited

U.S. PATENT DOCUMENTS

| | | | |
|---|---|---|---|
| 4,985,210 | 1/1991 | Minami | 422/171 |
| 5,106,588 | 4/1992 | Sims et al. | 422/180 |
| 5,125,231 | 6/1992 | Patil et al. | 422/171 |
| 5,332,554 | 7/1994 | Yasaki et al. | 422/180 |
| 5,409,671 | 4/1995 | Takemoto et al. | 422/180 |

*Primary Examiner*—Robert J. Warden
*Assistant Examiner*—Hien Tran
*Attorney, Agent, or Firm*—Cary W. Brooks

[57] ABSTRACT

In general, the present invention includes a catalytic converter including a substrate having a trimetal catalyst system thereon. The trimetal catalyst system includes a double coat system in which Pt and Rh are together on one layer and Pd is separate on a second layer. The invention also includes three discoveries. (1) It has been found that there is a conversion efficiency improvement when Pt and Rh are on the outer layer of a dual layer system while Pd is on the inner layer. (2) It has been found that there is a conversion efficiency improvement when the masses of the two layers are in a mass ratio of about 3:1 to about 1.25:1 and preferably 2:1. That is, the inner layer contains twice the washcoat mass as the outer layer. (3) It has been found that the dual coat system can be produced using one calcining step.

5 Claims, 5 Drawing Sheets

5,593,647

CATALYTIC CONVERTER HAVING TRI PRECIOUS METAL CATALYSTS

FIELD OF THE INVENTION

This invention relates to catalytic converters using tri precious metal catalysts for controlling vehicle emissions.

BACKGROUND OF THE INVENTION

With the increasingly stringent automotive emission requirements there is a need to maximize conversion of the three main pollutant gases HC, CO, and NOx. Most present catalyst formulations utilize either Pt-Rh or Pd-Rh bi-metal precious metals in the catalyst formulation. The Pt and Pd both are oxidizing precious metals and are used to oxidize the hydrocarbons and carbon monoxide to water and carbon dioxide, while the Rh precious metal is utilized to reduce NOx to nitrogen and oxygen. In order to maximize conversion of the three pollutant gases in both gasoline and alternatively fueled engines there is a need to utilize the three precious metals (Pt, Pd, and Rh) together in a catalyst formulation. The three precious metals would act synergistically to achieve maximum conversion efficiency. With the cost of the oxidizing precious metal Pt being 3 to 5 times the cost of Pd it would be cost effective to be able to reduce Pt content with increased Pd usage while at the same time improving emissions performance.

A problem associated with the usage of the three precious metals on one monolithic catalyst brick is that at the high temperatures encountered in automotive catalytic converters there is a sintering of the three precious metals. Sintering of the precious metals is defined as the coalescing of small precious metal clusters into larger precious metal clusters with the resulting effect of a loss in catalytic efficiency. There is a strong desire in automotive catalysis to reduce sintering. In the case of the trimetal precious metal system the sintering that occurs results in a surface enrichment of Pd over Pt and Rh. This Pd enrichment is undesirable and is due to the lower surface energy and lower heat of atomization of Pd compared to Pt and Rh. This sintering phenomena results in the Pt and Rh being buried under the Pd and thus not being able to contact the pollutant gases. In effect the Pt/Pd/Rh catalyst results in a Pd only catalyst. This sintering phenomena would especially adversely effect the Rh which is required for NOx conversion. In addition there would be an economic loss in that the reduced catalytic benefit would not justify the cost for the Pt and Rh precious metals.

The present invention provides advantages over the prior art.

SUMMARY OF THE INVENTION

In general, the present invention includes a catalytic converter including a substrate having a trimetal catalyst system thereon. The trimetal catalyst system includes a double coat system in which Pt and Rh are together on one layer and Pd is separate on a second layer. The invention also includes three discoveries.

(1) It has been found that there is a conversion efficiency improvement when Pt and Rh are on the outer layer of a dual layer system while Pd is on the inner layer.

(2) It has been found that there is a conversion efficiency improvement when the masses of the two layers are in a mass ratio of about 3:1 to about 1.25:1 and preferably 2:1. That is, the inner layer contains twice the washcoat mass as the outer layer.

(3) It has been found that the dual coat system can be produced using one calcining step.

These and other objects, features and advantages will be apparent from the following brief description of the drawings, detailed description, appended claims and accompanying drawings.

DETAILED DESCRIPTION

Figure 1A:
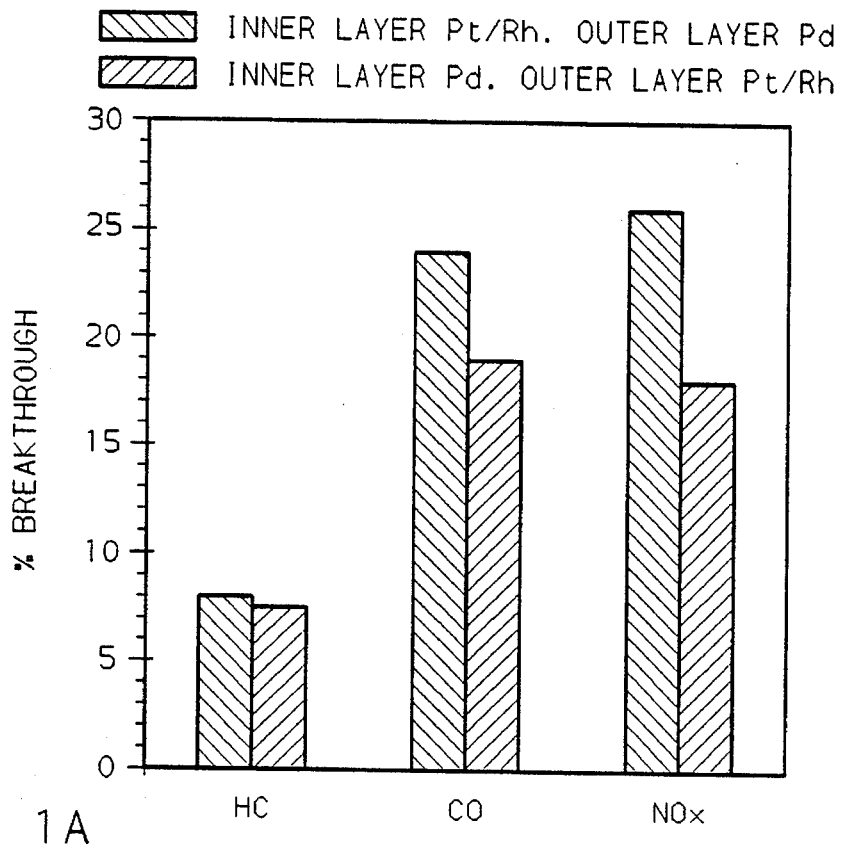
FIG. 1A is a graphic illustration of Sweep test emission data comparing the performance of the present invention with another system.
Figure 1B:
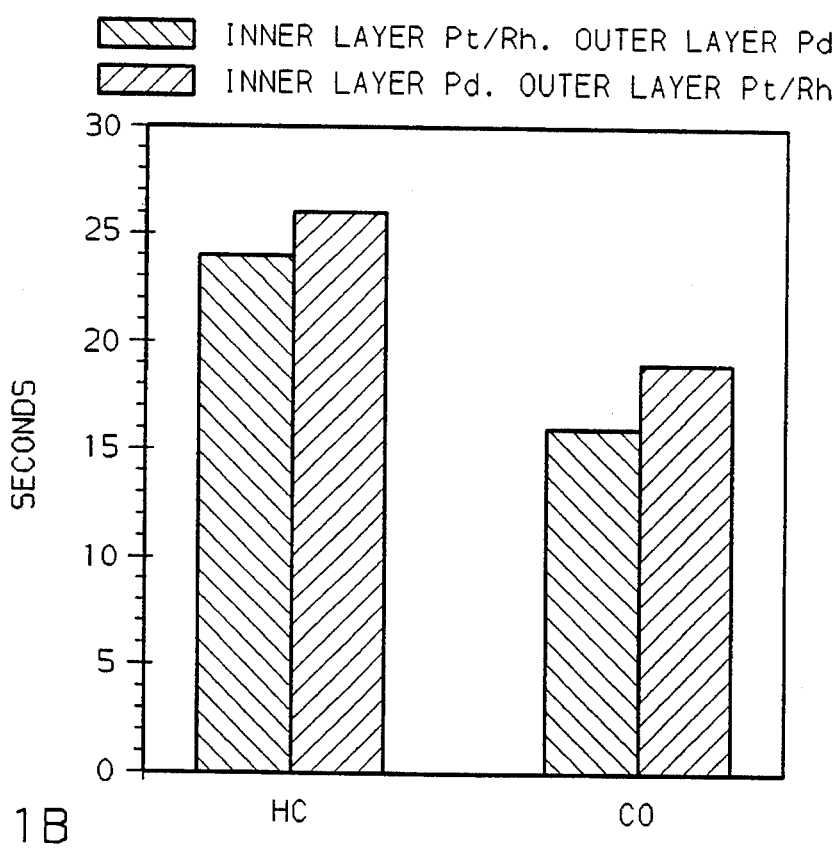
FIG. 1B is a graphic illustration of data for light off times for the present invention and another system.
Figure 1C:
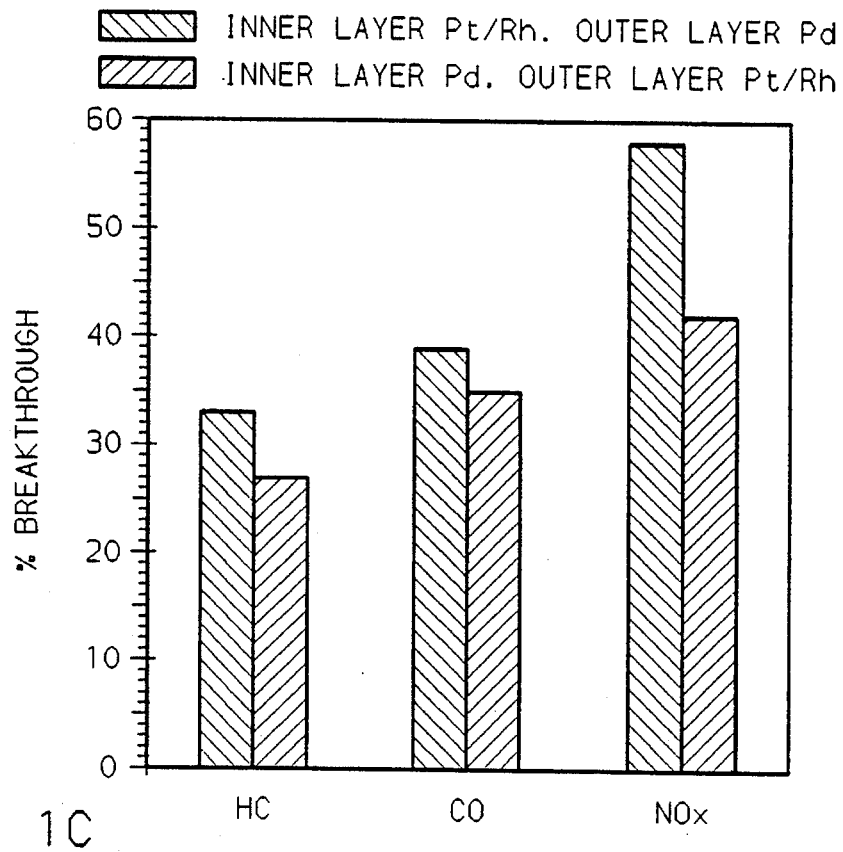
FIGS. 1C and 1D are graphic illustration of emission data for the present invention and another system under computer controlled engine cycles.
Figure 1D:
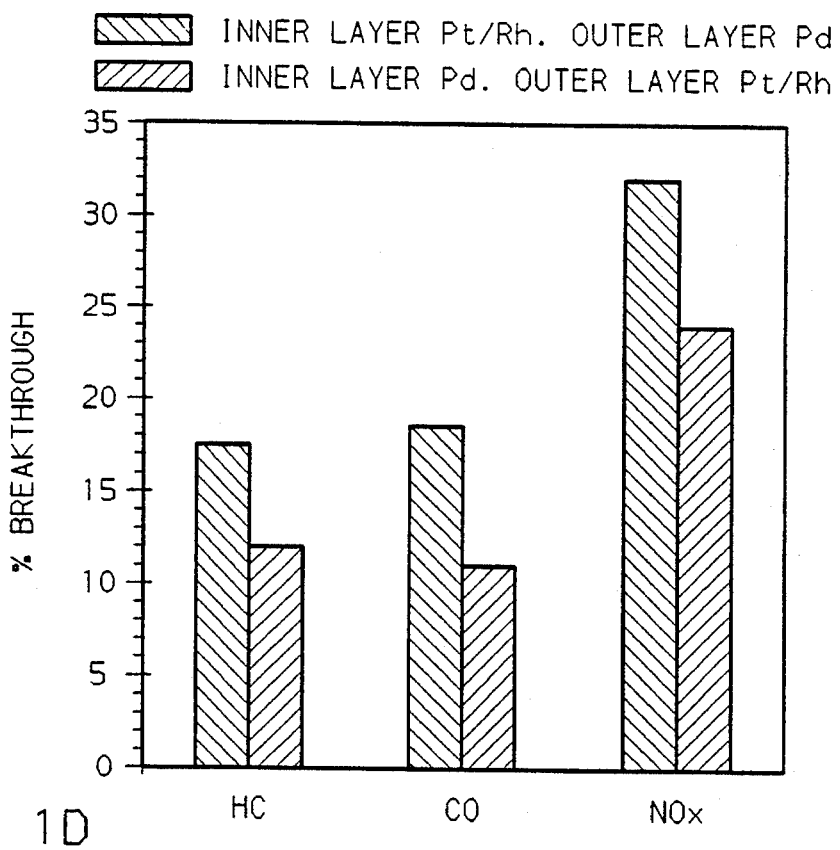

The present invention includes a catalytic converter having a ceramic honeycomb shaped substrate onto which a dual coat catalyst system is applied. The dual layer catalyst system includes a first layer or inner layer applied to the substrate and includes Pd, and a second layer applied to the first layer wherein the second layer includes Pt and Rh. The possible range of ingredients included in the washcoat which makes up the first layer includes the following by weight percent. Aluminum oxide in a range of 40% to 85%; cerium oxide in a range of 10% to 40%; zirconium oxide in a range of 0 to 20%; lanthanum oxide in a range of 0 to 20%; and nickel oxide in a range of 1% to 10%. (The actual percentage used for this formulation was 28% ceria, 3% nickel oxide, and 69% alumina). A range of possible ingredients for the second washcoat formulation which makes up the second layer includes the following components by weight percent. Aluminum oxide in a range of 40% to 85%; cerium oxide in a range of 10% to 40%; zirconium oxide in a range of 0 to 20%; lanthanum oxide in a range of 0 to 20%; and nickel oxide in a range of 1% to 10%. Both washcoat layers are applied to the substrate by any one of a variety of methods such as dipping, spraying, waterfall technique, or preferably washcoating utilizing the placement of slurry on top of a monolith and applying suction to the bottom of the monolith resulting in a uniform nonplugging application. The washcoat for the first layer when applied has a thickness ranging from about 10 microns to about 60 microns. Unique to this invention, the first layer is partially dried to reduce the water content on the inner washcoat layer by 50 percent. This is accomplished by placing the substrate coated with the first layer in a oven operated at a temperature ranging from about 40° C. to about 150° C. for about 1 to about 40 minutes. The partial drying of the inner layer prevents subsequent plugging of the monolith cells upon addition of the second layer. Plugged cells in any washcoat system is an important problem and any process which reduces plugging provides a substantial advantage. The second layer or outer layer is applied in the same manner and so that the thickness of the applied washcoat ranges from about 10 microns to about 60 microns. The substrate coated with the two layers then undergoes a calcination step wherein the coated substrate is heated to a temperature of about 400° C. to about 550° C. for a period of about 1 to about 3 hours. Improved emission performance is obtained from the catalytic converter when the two layers are in a mass ratio ranging from about 3:1 to about 1.25:1 and preferably about 2:1. That is, the inner layer contains twice the washcoat mass as the outer layer.

FIG. 1 compares two dual layer systems which were both engine aged using 50 hours of the RAT A schedule. RAT A stands for Rapid Aging Test for 50 hours duration. This engine aging schedule is conducted on a 4.3 L engine and consists of specific computer controlled open loop-closed loop, rich-lean, air injected cycles for a specific cycle time. The test is equivalent to 100,000 miles of customer driving. This chart shows that there is improved efficiency when Pd is on the inner layer of dual layer system (with Pt/Rh being on the outer layer). There is a 23 percent breakthrough improvement for CO and a 15 percent NOx breakthrough improvement for the Sweep test. Breakthrough (in percent) is 100% minus catalyst conversion efficiency and the lower the breakthrough value the better the catalyst. The Sweep test is a performance test which involves a computer controlled schedule that consists of specific loads, RPM's, and ramped air/fuel ratios. Hydrocarbons (HC), carbon monoxide (CO), and oxides of nitrogen (NOx) are measured for efficiency of conversion. There is a 22 a percent breakthrough improvement for NOx in the Dyno FTP (5.7 L engine) test. A dyno F test is a simulated Federal Test Procedure (FTP) test and is made up of 23 computer controlled cycles each consisting of specific accelerations, decelerations, cruise, and idle modes. HC, CO, and NOx are measured. There is a 46 percent breakthrough improvement for HC, 39 percent improvement for CO, and 23 percent improvement for NOx in the 2.5 L vehicle FTP test. The lightoff times for Pd on the inner layer is within 2 seconds of the catalyst in which Pd is on the outer layer. Lightoff is the time it takes for the converter to remove from the exhaust stream 50 percent by weight of the specific constituent monitored once the engine (or test) is started. This implies that although Pd is on the inner layer and is covered by the Pt/Rh containing outer layer there is still catalytic activity taking place in the conversion of the exhaust gases.

Figure 2A:
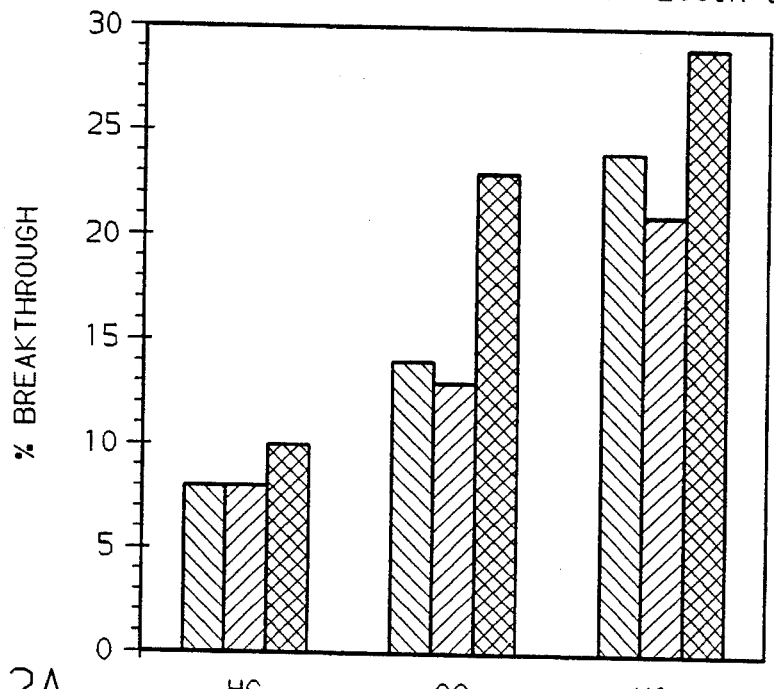
FIGS. 2A–2D are graphic illustrations of the data for similar test corresponding to FIGS. 1A–1D but comparing various mass ratios of Pd to Pt/Rh for a two layer washcoat catalyst according to the present invention.
Figure 2B:
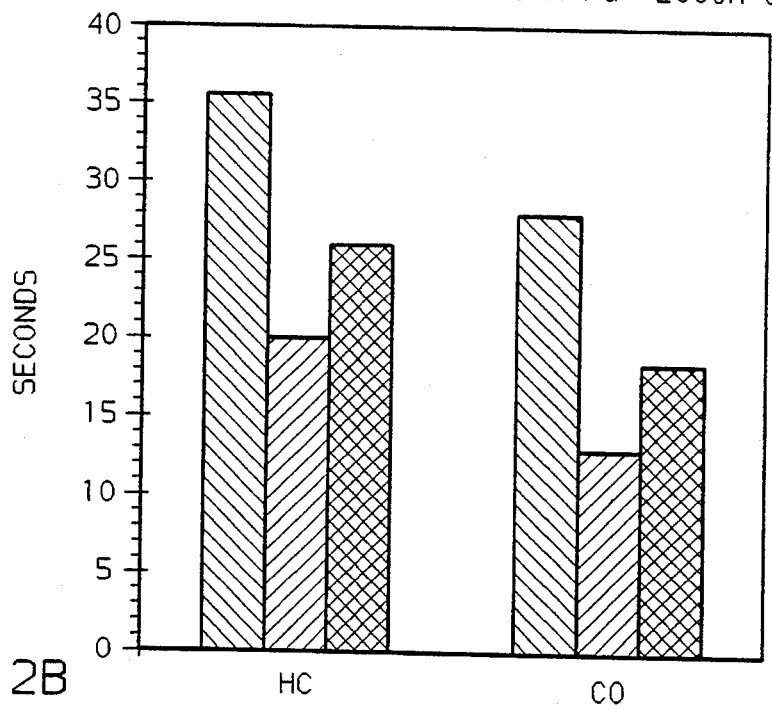
Figure 2C:
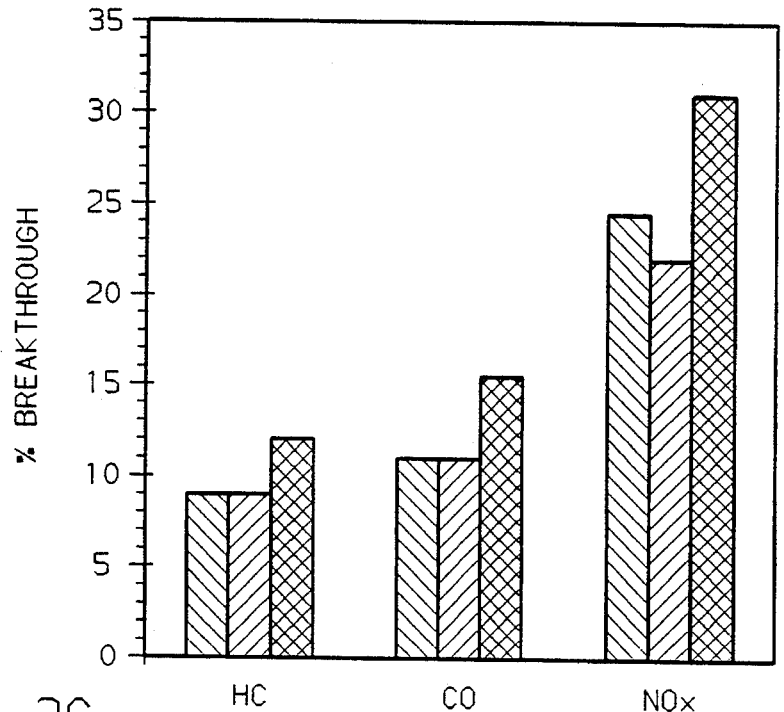
Figure 2D:
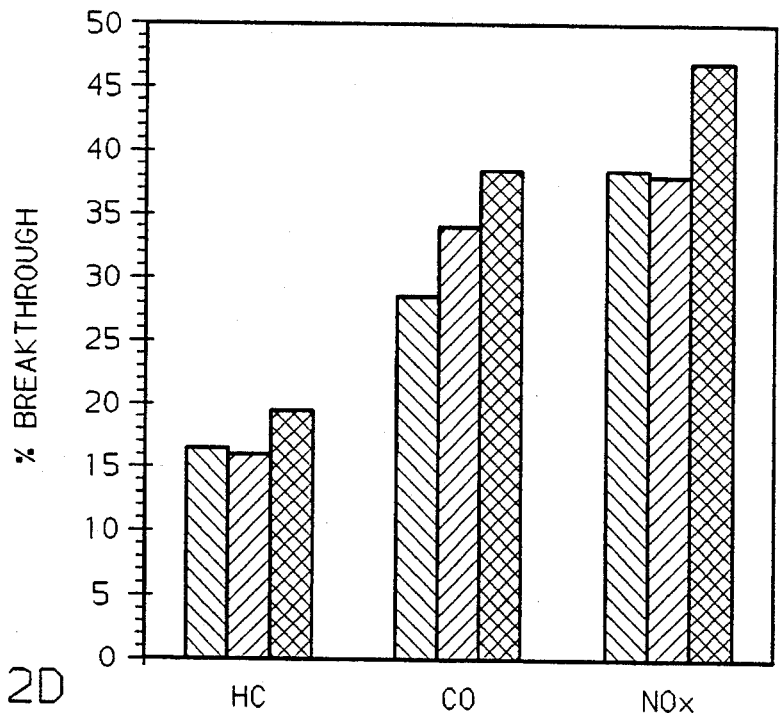

FIGS. 2A–2D show washcoat mass ratio results. In FIG. 2A, the aging schedule was the RAT A schedule for 50 hours. Aging schedule refers to the previously mentioned Rapid Aging Test which is computer controlled and is equivalent to 100,000 miles of customer driving. Each of the three formulations contain Pd on the inner layer with Pt/Rh being on the outer layer. The masses of the two layers are varied to give (1) 150 gm inner-150 gm outer (1:1 ratio), (2) 200 gm inner-100 gm outer (2:1 ratio), and (3) 100 gm inner-200 gm outer (1:2 ratio). FIG. 2A shows the 2:1 ratio is the best and would be desirable. This 2:1 ratio dual layer system contains Pd on 200 grams of washcoat on the inner layer while on the outer layer is 100 grams of washcoat containing Pt/Rh. When the 2:1 washcoat mass ratio is compared with the 1:2 mass ratio there is an breakthrough improvement of 29 percent for NOx in the Dyno FTP (3800 engine) (FIG. 2C); and an improvement in the vehicle FTP (3.1L engine) by 16 percent for HC, 11 percent for CO, and 19 percent for NOx (FIG. 2D). Also the lightoff times for the 2:1 ratio are lower and improved by 23 percent for HC and 30 percent for CO (FIGS. 2B).

Figure 3:
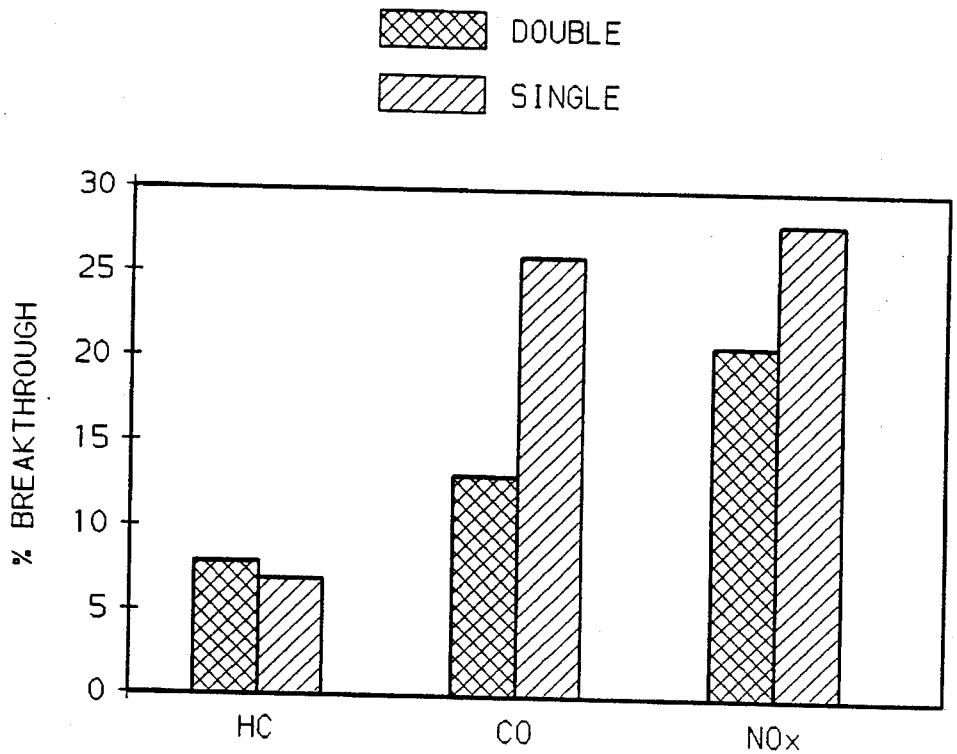
FIG. 3 is a graphic illustration of Sweep test data for the present invention and another system.
Figure 4:
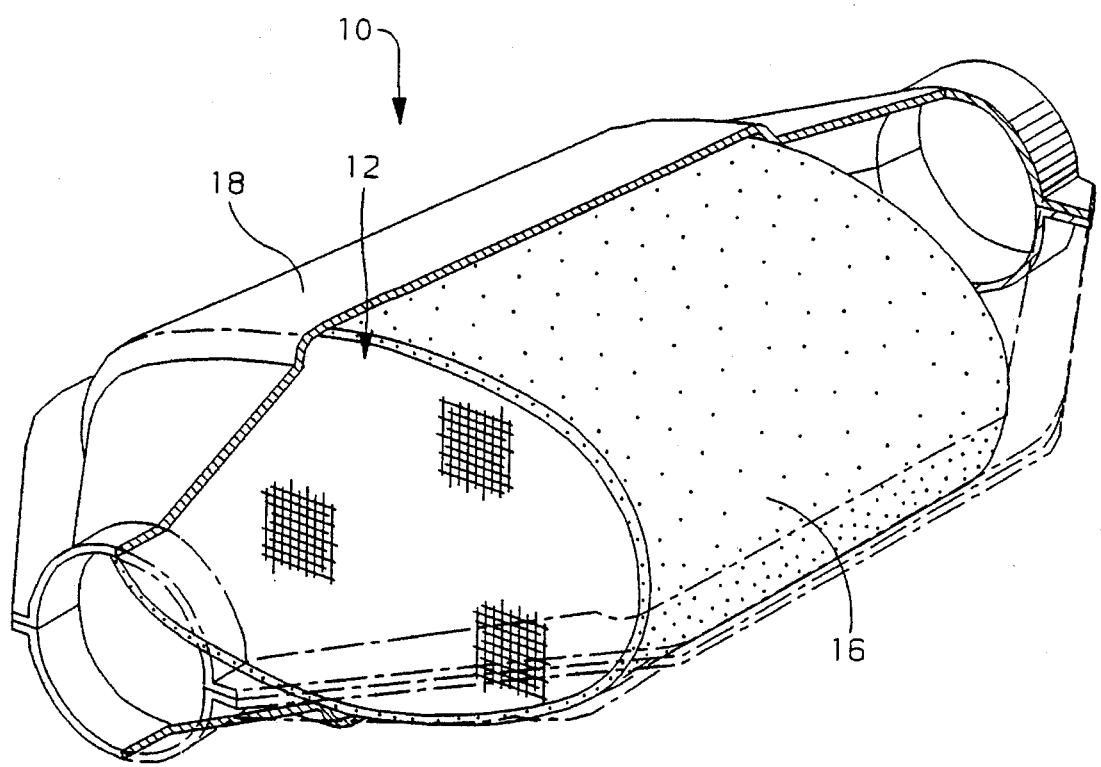
FIG. 4 is a graphic illustration of a catalytic converter with substrate cells and a catalytic washcoat thereon.

FIG. 3 compares engine aged Sweep breakthrough results for the trimetal catalyst system of this invention with a trimetal system in which there is a single layer. The single layer trimetal system has the Pt, Pd, and Rh salts added together in a catalyzed slurry process and does not include any elements of this invention. The dual layer system contains methods of this invention which include Pd on the inner layer at a 2:1 mass ratio with Pt/Rh on the outer layer. The partial drying technique with only one calcining step was used. The washcoat formulation is the same for both catalysts. The Sweep breakthrough shows that there is an improvement of 50 percent for CO and a 25 percent improvement for NOx. The presence of the attributes of this invention is responsible for the improvement seen in this trimetal system. Thus the efficiency improvements seem to suggest that sintering and Pd surface enrichment has been retarded by use of methods of this invention. FIG. 4 illustrates a catalytic converter 10 having a coating system according to the present invention. The catalytic converter includes a substrate 12 having cells formed therein, wherein the substrate is surrounded by a mat 16 and a housing 18 as is known to those skilled in the art.

What is claimed is:

1. A product comprising:

a catalytic converter for use in a vehicle including a substrate having cells defined therein, and a dual coating catalyst system coated on the substrate;

said dual coating catalytic system having a first layer coated on the substrate, said first layer comprising a metal catalyst consisting essentially of Pd; and a second layer applied to said first layer, said second layer comprising a metal catalyst consisting essentially of Pt and Rh; and wherein said first and second layers have a mass ratio ranging from about 3:1 to about 1.25:1.

2. A product as set forth in claim 1 wherein said first and second layers have a mass ratio of about 3:1 to 2:1.

3. A method comprising:

providing a catalytic converter including a substrate having cells defined therein;

applying a first catalytic washcoat layer to the substrate, said first catalytic washcoat layer comprising water and a metal catalyst consisting essentially of drying said first washcoat layer to remove a substantial portion of the water therein; applying a second catalytic washcoat layer to the dried first catalytic washcoat layer, said second catalytic washcoat layer comprising a metal catalyst consisting essentially of Pt and Rh;

calcining the catalytic washcoat layers by heating said catalytic washcoat layers at a temperature ranging from about 400° C. to about 550° C.

4. A method as set forth in claim 3 wherein said first and second catalytic washcoat layers have a mass ratio ranging from about 3:1 to about 1.25:1.

5. A method as set forth in claim 3 wherein said first and second catalytic washcoat layers have a mass ratio of about 2:1.

* * * * *